US005998033A

United States Patent [19]

Tan et al.

[11] Patent Number: 5,998,033

[45] Date of Patent: Dec. 7, 1999

[54] FUSER MEMBER WITH METAL OXIDE FILLERS, SILANE COUPLING AGENTS, AND FUNCTIONALIZED RELEASE FLUIDS

[75] Inventors: Biao Tan, Rochester; Jiann H. Chen, Fairport; Tonya D. Binga; Douglas B. Wilkins, both of Rochester, all of N.Y.

[73] Assignee: Eastman Kodak Company, Rochester, N.Y.

[21] Appl. No.: 08/961,838

[22] Filed: Oct. 31, 1997

[51] Int. Cl.$^6$ .......................... B32B 25/02; B32B 25/04; B32B 25/08; B32B 24/14

[52] U.S. Cl. ......................... 428/422; 428/36.9; 428/421; 428/447; 355/284

[58] Field of Search .................................... 428/421, 422, 428/447, 446, 451; 524/561, 567; 525/100, 101, 102; 492/49.53, 56.59; 355/284

[56] References Cited

U.S. PATENT DOCUMENTS

| | | | |
|---|---|---|---|
| 5,017,432 | 5/1991 | Eddy et al. | 428/422 |
| 5,269,740 | 12/1993 | Fitzgerald et al. | 492/56 |
| 5,292,562 | 3/1994 | Fitzgerald et al. | 428/35.8 |
| 5,292,606 | 3/1994 | Fitgerald | 428/35.8 |
| 5,336,596 | 8/1994 | Bronstein et al. | 435/6 |
| 5,366,772 | 11/1994 | Badesha et al. | 428/35.8 |
| 5,401,570 | 3/1995 | Heeks et al. | 428/332 |
| 5,464,698 | 11/1995 | Chen et al. | 428/421 |
| 5,480,724 | 1/1996 | Fitzgerald et al. | 428/447 |
| 5,595,823 | 1/1997 | Chen et al. | 428/421 |
| 5,824,416 | 10/1998 | Chen et al. | 428/422 |

*Primary Examiner*—Vivian Chen
*Attorney, Agent, or Firm*—Dorren M. Wells

[57] ABSTRACT

A fuser member having improved toner offset release and wear characteristics. The outermost layer comprises a fluoroelastomer with thermally conductive metal oxide fillers and a silane coupling agent that is interactive with the fluoroelastomer and with a release agent which may, optionally, be used on the surface of the fluoroelastomer layer.

25 Claims, No Drawings

FUSER MEMBER WITH METAL OXIDE FILLERS, SILANE COUPLING AGENTS, AND FUNCTIONALIZED RELEASE FLUIDS

CROSS REFERENCE TO RELATED APPLICATIONS

This application is related to the following commonly owned U.S. applications filed on even date herewith: U.S. Ser. No. 08/962,129 of Tan, Chen, Binga and Wilkins, titled FUSER MEMBER WITH SURFACE TREATED $Al_2O_3$ AND FUNCTIONALIZED RELEASE FLUIDS, and U.S. Ser. No. 08/962,108 of Tan, Chen, Binga and Staudenmayer, titled FUSER MEMBER WITH SURFACE TREATED $SnO_2$ FILLER.

FIELD OF THE INVENTION

This invention relates generally to heat fusing members and methods of making same. More particularly, it relates to an improved fuser roller surface that decreases toner offset and abrasion and increases toner release and thermal conductivity.

BACKGROUND OF THE INVENTION

In electrophotographic fuser systems, fuser roller overcoats are made with layers of polydimethylsiloxane (PDMS) elastomers, fluorocarbon resins and fluorocarbon elastomers. PDMS elastomers have low surface energy and relatively low mechanical strength, but is adequately flexible and elastic and can produce high quality fused images. After a period of use, however, the self-release property of the roller degrades and offset begins to occur. Application of a PDMS oil during use enhances the release property of the fuser roller surface but shortens roller life due to oil swelling. Fluorocarbon resins like polytetrafluoroethylene (PTFE) have good release property but less flexibility and elasticity than PDMS elastomers. Fluorocarbon elastomers, such as Viton™ and Fluorel™, are tough, flexible, resistant to high temperatures, durable and do not swell, but they have relatively high surface energy and poor thermnal conductivity.

Particulate inorganic fillers have been added to fluorocarbon elastomers and silicone elastomers to increase mechanical strength and thermal conductivity. High thermal conductivity is an advantage because heat needs to be efficiently and quickly transmitted from an internally heated core to the outer surface of the fuser roller to fuse the toners and yield the desired toner images. However, incorporation of inorganic fillers to improve thermal conductivity has a major drawback: it increases the surface energy of fuser roller surface and also increases the interaction of the filler with the toner and receiver. After a period of use, the toner release properties of the roller degrade and toner offset begins to occur due to roller wear and weak interaction between the filler and the polymer matrix. It would be desirable to provide a fuser member having a fluorocarbon elastomer overcoat layer containing thermally conductive inorganic fillers, but which still has a moderately low surface energy and good toner release property. In addition, it should be compatible with the functionalized polymeric release agent employed during fixing process.

Fuser members of fluorocarbon elastomer containing inorganic filler are disclosed, for example, U.S. Pat. No. 5,464,698 to Chen et al. which describes fuser rollers having a surface layer comprising fluorocarbon elastomer and tin oxide fillers. The fillers provide active sites for reacting the mercapto-functional polydimethylsiloxane. However, the inorganic fillers are not combined with a coupling agent and remain highly reactive with the toner and charge control agent, and this is undesirable.

U.S. Pat. No. 5,595,823 to Chen et al. describes fuser rollers having a surface layer comprising fluorocarbon elastomer and aluminum oxide fillers which also are not combined with a coupling agent and so are prone to high reactivity with toner and charge control agent which, again, is undesirable.

U.S. Pat. No. 5,017,432 to Eddy et al. describes a fluorocarbon elastomer fuser member which contains cupric oxide to interact with the polymeric release agent and provide an interfacial barrier layer.

Fuser members of condensation-crosslinked PDMS elastomers filled with metal oxides are disclosed, for example, in U.S. Pat. No. 5,401,570 to Heeks et al. This patent describes a silicone rubber fuser member containing aluminum oxide fillers which react with a silicone hydride release oil.

U.S. Pat. No. 5,480,724 to Fitzgerald et al. discloses tin oxide fillers which decrease fatigue and creep (or compression) of the PDMS rubber during continuous high temperature and high stress (i.e. pressure) conditions.

Some metal oxide filled condensation-ured PDMS elastomers are also disclosed in U.S. Pat. No. 5,269,740 (cupric oxide filler), U.S. Pat. No. 5,292,606 (zinc oxide filler), U.S. Pat. No. 5,292,562 (chromium oxide filler), and U.S. Pat. No. 5,336,596 (nickel oxide filler). All provide good results.

Unfortunately, as fuser rollers wear, the metal oxide fillers that are exposed react not only with the functionalized polymeric release agent, but also with the toner, paper substrate and charge control agent. Such reactions build up debris on the surface of the fuser roller, causing deterioration of toner release and great reduction in the life of the fuser roller. Thus, there remains a need for fuser members whose metal oxide fillers are made to enhance the interaction between elastomer and filler and also between the polymeric release agent and filler.

SUMMARY OF THE INVENTION

The present invention provides an effective way to solve the problems described above. By filling a fluorocarbon elastomer with metal oxide particles and a coupling agent, the present invention provides a fuser member with the desired thermal conductivity and toner release properties.

More particularly, the invention provides a method of making a fuser member comprising a support and coated thereon a fluoroelastomer layer comprising a metal oxide filler and a silane coupling agent.

The present invention also provides a method of making a fuser member comprising the steps of: a) providing a cylindrical core; b) compounding a fluoroelastomer with a metal oxide filler and a silane coupling agent; c) coating the fluoroelastomer on the cylindrical core; and d) curing the fuser member.

Metal oxide fillers in the presence of a coupling agent can interact with fluorocarbon polymers and bond with them. The presence of a coupling agent also helps to wet the filler surface and thereby facilitate compounding. The fuser member of the invention greatly improves fuser/toner release, toner offset on the roller surface and decreases abrasion of the fuser member overcoat. The invention provides an effective, durable fuser roller and high quality copies at high speed.

The toner/fuser release can be further improved by applying to the outermost layer of the fuser member an effective amount of a polymethyldisiloxane (PDMS) release agent that, optionally, includes at least one functional group reactive with the fluoroelastomer, followed by incubation at an elevated temperature. While not wishing to be bound by the proposed theory, it is believed that the functional groups on the coupling agent bring about an interaction between filler and release fluid, thereby forming a protective layer between toner and filler.

An additional advantage is that this invention allows for a high percentage of metal oxide fillers in the fluoroelastomer and therefore high thermal conductivity can be achieved. At the same time, critical fuser properties such as release and wear are not sacrificed.

DETALED DESCRIPTION OF THE INVENTION

The fluorocarbon elastomers used in the invention were prepared according to the method described in commonly owned U.S. Ser. No. 08/805,479 U.S. Pat. No. 5,851,673, of Chen et al. filed Feb. 25, 1997, titled TONER FUSER MEMBER HAVING A METAL OXIDE FILLED FLUOROELASTOMER OUTER LAYER WITH IMPROVED TONER RELEASE as follows.

In the fuser member of the present invention, the outermost layer comprises a cured fluoroelastomer, preferably a terpolymer of vinylidene fluoride (VF), tetrafluoroethylene (TFE), and hexafluoropropylene (HFP), that includes at least about 21 mole percent HFP and, preferably, at least about 50 mole percent VF. Among commercially available fluoroelastomers, Viton™ materials, obtainable from DuPont, are frequently employed for the fabrication of fuser members. These materials include Viton™ A, containing 25 mole percent HFP; Viton™ E45, containing 23 mole percent HFP; and Viton™ GF, containing 34 mole percent HFP.

A preferred fluoroelastomer for the outermost layer of the fuser member of the present invention is Fluorel™ FX-9038, available from 3M, containing 52 mole percent VF, 34 mole percent TFE, and 14 mole percent HFP. More preferred is Fluorel™ FE-5840Q, also available from 3M, containing 53 mole percent VF, 26 mole percent TFE, and 21 mole percent HFP.

At least 10 parts by weight of metal oxide per 100 parts by weight of cured fluoroelastomer are included in the outermost layer of the fuser member. The metal oxide may be cupric oxide, aluminum oxide, or mixtures thereof. In a preferred embodiment, 10 to 50 parts of cupric oxide are included in the outermost layer. Alumina may also be included as a thermally conductive filler in the layer; in one embodiment, 120 parts per 100 parts (by weight) of fluoroelastomer are incorporated.

The preferred silane coupling has the general structure:

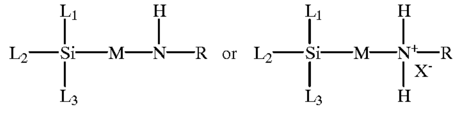

wherein

M=aliphatic or aromatic chain with C atom numbers vary from 0–20.

R=proton, phenyl or alkyl, etc.

$L_1$, $L_2$, $L_3$=Alkoxy, alkyl, halide, etc. with C atom numbers vary from 0–10 and at least one of the L should be alkoxy or halide.

X=negative counter ion, e.g. chloride ion, bromide ion, etc.

Suitable coupling agents are 3-aminopropyltrimethoxysilane, 3-arninopropyltriethoxysilane, N-phenylaminopropyltrimethoxysilane, (aminoethylaminomethyl)phenethyltrimethoxysilane, aminophenyltrimethoxysilane, 3-aminopropyldimethoxysilane, 3-aminopropylmethyldiethoxysilane, 3-(2-aminoethylamino)propyltrimethoxysilane, 3-(2-N-benzylaminoethylaminopropyl)trimethoxysilane hydrochloride, etc.

Although the fuser member of the invention, wherein the metal oxide particles are in contact with a coupling agent, exhibits generally good toner offset and release characteristics, these properties may be improved by applying a polydimethylsiloxane (PDMS) release agent to the outermost layer and incubating the fuser member to form a surface that displays enhanced toner release. Preferred PDMS release agents, which include a functional group that is reactive with the fluoroelastomer, have the formula

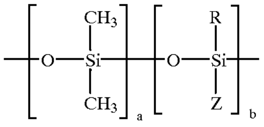

where R is alkyl or aryl, Z is selected from the group consisting of hydrogen, aminoalkyl containing up to about 8 carbon atoms, and mercaptoalkyl containing up to about 8 carbon atoms, and the ratio of a:b is about 1:1 to 3000:1. In more preferred embodiments, Z is hydrogen, aminopropyl, or mercaptopropyl. In a particularly preferred embodiment, Z is hydrogen and the a:b ratio is about 10:1 to 200:1. In another particularly preferred embodiment, Z is aminopropyl and the a:b ratio is about 200:1 to 2,000:1.

An example of a hydrogen-functionalized PDMS release agent is EK/PS-124.5 (available from United Chemical), which contains 7.5 mole percent of the functionalized component and has a viscosity of 225 centistokes. Xerox amino-functionalized PDMS 8R3995 fuser agent II contains 0.055 mole percent of an aminopropyl-substituted component and has a viscosity of 300 centistokes. Xerox mercapto-functionalized PDMS 8R2955 contains 0.26 mole percent of a mercaptopropyl-substituted component and has a viscosity of 275 centistokes. A non-functionalized PDMS release oil, DC-200 (from Dow Corning), is useful for purposes of comparison with the functionalized agents and has a viscosity of 350 centistokes.

Materials

Fluorel™ FE Fluoroelastomer 5840Q, ter-polymer of vinylidene fluoride, hexafluoropropylene and tetrafluoroethylene (FE5840Q)—3M, Co.

MgO (Maglite™ D)—Merck/Calgon Corp.

$Ca(OH)_2$—Aldrich®

$Al_2O_3$ (T-64)—Whitaker Clark & Daniels, Inc.

CuO—J. T. Baker®

3-Aminopropyltriethoxylsilane (NCR)—PCR®

N-phenylaminopropyltrimethoxysilane (sec-NCR)—Gelest, Inc.

The invention is further illustrate by the following examples and comparative examples:

EXAMPLE 1 (E-1)

Compounding

Fluorel™ FE5840Q (100 gm), MgO (3 gm), Ca(OH)2 (6 gm), $Al_2O_3$ (120 gm) and CuO (10 gm) were thoroughly compounded in a two roll mill with water cooling at 63° F. (17° C.) until a uniform, dry composite sheet was obtained. During compounding, 3-aminopropyltriethoxysilane (NCR, 0.12 gm, 0.1%) was used as additives and compounded with the fillers.

Preparation of a Compression Mold Slab

The fluoroelastomer-fillers gum obtained as just described above was compression molded into 75-mil test plaques, with curing for 20 minutes at 350° F. (177° C.) under 45 tons pressure and post-curing for 48 hours at 450° F. (232° C.). The test plaque was employed to evaluate the toner offset and release characteristics, wear and thermal conductivity. Results are indicated in Table 1.

EXAMPLE 2 (E-2)

Example 2 was carried out by following essentially the same procedure as described for Example 1 except that 0.6 gm of NCR (0.5%) was used instead of 0.12 gm NCR. Results are indicated in Table 1.

EXAMPLE 3 (E-3)

Example 3 was carried out by following essentially the same procedure as described for Example 1 except that 1.2 gm of NCR (1%) was used instead of 0.12 gm NCR. Results are indicated in Table 1.

EXAMPLE 4 (E-4)

Example 4 was carried out by following essentially the same procedure as described for Example 3 except that the additive was N-phenylaminopropyltrimethoxysilane (sec-NCR) instead of 3-aminopropyltriethoxysilane (NCR). Results are indicated in Table 1.

COMPARATIVE EXAMPLE 1 (C-1)

Substantially the same procedure was followed as in Example 1, except that no coupling reagent was used as additives.

Test Methods for Results in Table 1

The three tests described immediately below were conducted using the plaques of Example 1 above. Results appear in Table 1.

Toner Offset and Release Measurement

These procedures are described in U.S. Ser. No. 08/805, 479 of Chen et al. filed Feb. 25,1997, titled TONER FUSER MEMBER HAVING A METAL OXIDE FILLED FLUOROELASTOMER OUTER LAYER WITH IMPROVED TONER RELEASE as follows.

The test plaques obtained as described above are employed to evaluate the toner offset and release force characteristics of the outermost layer of the fuser members. A plaque was cut into 1-inch (2.56-cm) squares. One of these squares was left untreated by release agent. To the surface of the other square was applied in unmeasured amount PDMS release oils: EK/PS-124.5 hydrogen-functionalized PDMS release oil.

Each sample was incubated overnight at a temperature of 175° C. Following this treatment, the surface of each sample was wiped with dichloromethane. Each sample was then soaked in dichloromethane for one hour and allowed to dry before off-line testing for toner offset and release properties.

Each sample, including those untreated with release agent, was tested in the followong manner:

A 1-inch (2.56-cm) square of paper covered with unfused styrene-butyl acrylate toner was placed in contact with a sample on a bed heated to 175° C., and a pressure roller set for 80 psi was locked in place over the laminate to form a nip. After 20 minutes the roller was released from the laminate.

The extent of offset for each sample was determined by microscopic examination of the sample surface following delamination. The following numerical evaluation, responding to the amount of toner remaining on the surface, was employed.

1 0% offset 2 1–20% offset 3 21–50% offset 4 51–90% offset 5 91–100% offset

Qualitative assessment of the force required for delamination of the paper from the sample is as follows:

1 low release force 2 moderate release force 3 high release force

Wear Measurement

A peice of plaque 9/16"×2" was cut for the wear test. A Norman abrader (by Norman Tool, Inc.) was used, and the temperature was set at 350° F. The speed was set at ~30 cycles/minute and the load was set at 984 g.

Four rolls of paper were run on the plaque sample for 480 cycles each and the wear tracks were measured for depth by a surfanalyzer. The average of the four tracks was reported in mils.

Thermal Conductivity Measurement

A round piece of plaque 5 cm diameter was cut for the test. Thermal conductivity was measured by Holometrix™ TCA-100 Thermal Conductivity Analyzer. Reported values (BTU/hr-ft-° F.) were from two stacks of samples.

TABLE 1

FE5840Q 100 pt with 3 parts MgO/6 parts Ca(OH)2

| Sample ID | Fillers | Coupling Reagent | Offset/Release with hydride-PDMS oil | Wear | Thermal Conductivity |
|---|---|---|---|---|---|
| C-1 | $Al_2O_3$ 120 pt CuO, 10 pt | none | 1/1 | 4.2 | 0.31 |
| E-1 | $Al_2O_3$ 120 pt CuO, 10 pt | 0.1% NCR | 2/2 | 2.5 | |
| E-2 | $Al_2O_3$ 120 pt CuO, 10 pt | 0.5% NCR | 2/2 | 2.5 | |
| E-3 | $Al_2O_3$ 120 pt CuO, 10 pt | 1% NCR | 1/1 | 2.9 | 0.26 |
| E-4 | $Al_2O_3$ 120 pt CuO, 10 pt | 1% Sec-NCR | 1/2 | 3.0 | 0.30 |

NCR—3-Aminopropyltriethoxysilane

Sec-NCR—N-phenylaminopropyltrimethoxysilane

The results demonstrate that wear resistance was significantly improved where the filler and elastomer were compounded with a silane coupling agent solution and this improvement was not at the cost of offset and release.

EXAMPLE 5 (E-5)

The compounded formulation used for the fuser roller outer layer is the same as in Example 4 (E-4). The fuser roller was prepared as follows:

A cylindrical stainless steel core was cleaned with dichloromethane and dried. The core was then primed with a uniform coat of a metal oxide primer, Dow 1200 RTV Primer Coat™ primer, marketed by Dow Corning Corp. of Midland, Mich. Silatic™ J RTV (room temperature cured) silicon rubber, marketed same by Dow Corning, were than mixed with catalyst and injection molded onto the core and cured at 232° C. for 2 hours under 75 tons/inch$^2$ of pressure. The roller was then removed from the mold and cured in a convection oven with a ramp to 232° C. for 24 hours and at 232° C. for 24 hours. After air cooling, EC-4952, a silicone rubber elastomer marketed by Emerson Cunning Division of W.R. Grace and Co. of Conn., was blade coated directly onto the Silastic™ J layer, then cured for 12 hours at about 210° C., followed by 48 hours at 218° C. in a convection oven. After air cooling, the EC-4952 was grounded to 20 mil. The cured EC-4952 was corona discharged for 15 minutes at 750 Watts and the outer layer was applied.

The outer layer was prepared as a 25 wt. % solid solution in a 85:15 mixture of methyl ethyl ketone and methanol. The resulting material was ring coated onto the EC-4952 layer, air dried for 16 hours, baked with ramping for 4 hours to 205° C., and kept at 205° C. for 12 hours. The resulting outer layer had a thickness of 1 mil.

The cushion layers of EC-4952 and Silastic™ J are optional and preferred. Where the base cushion layer is absent, the fluoroelastomer layer is coated directly onto the metal core. Also optionally, the base cushion layer can contain thermally conductive fillers such as aluminum oxide, iron oxide and silica. Further, there can be an optional adhesive layer deposited between the base cushion layer and the fluoroelastomer layer.

The fuser roller was used for machine test for jam rates, dry release and heating roller contamination as shown in Table 2-1.

EXAMPLE 6

The compounded formulation used for the fuser roll outer layer is the same as in Example 4 (E-4). The fuser roll was prepared the same as in Example 5 and the test results are shown in Table 2-2.

COMPARATIVE EXAMPLE 2 (C-2)

The compounded formulation used for the fuser outer layer is the same as in Comparative Example 1 (C-1). The fuser roller was prepared the same as in Example 5 and the test results are indicated in Table 2-1 and Table 2-2.

Test Methods for Results in Tables 2-1 and 2-2

The three tests described immediately below were conducted using the fuser roller of example 5 (E-5) and 6 (E-6) and comparative example 2 (C-2).

Results appear in Tables 2-1 and 2-2.

Jam Rates:

The fuser roll and heater roll were installed along with other components (oiler and functional release agent, etc.) and the fuser parameters were set to 365° F. idle temperature and 0.350" nip. Nine thousand copies of 4 different images (blank, Gutenbergs, TT65 and contamination) and papers were run. Another 3,000 copies were run; these were of a stress release image using 16# paper at the above condition. The jam rate used was: Jams/3000. These tests were repeated twice as described above, but instead, the temperatures were 340° F. and 395° F. idle temperature allowing the nip to vary with the temperature change.

Dry Release:

After the jam rate test, this test was set up at 365° F. idle temperature and 0.35" nip. One thousand blank copies (plain paper) were run. The oiler wick was removed and the stress release image run for three consecutive jams and the total copy count for the three jams was recorded as dry release.

Heating Roller Contamination:

After the dry release test, the cross sectional area of any toner built up on the heater roll surface ($E^{-6}$ $in^2$) was recorded.

TABLE 2-1

FE5840Q 100 pt with $Al_2O_3$/CuO fillers with hydride-PDMS release fluid

| Sample ID | C-2 | E-5 |
|---|---|---|
| $Al_2O_3$/CuO | 120/10 untreated | 120/10 with 1% NCR |
| Jam rates: | | |
| 340° F. | 0 | 0 |
| 365° F. | 0.0094 | 0 |
| 395° F. | 0.0412 | 0.2857 |
| Dry release | 44 | 722 |
| Heating roller contamination | 17856 | 7368 |

NCR-Aminopropyltriethoxysilane

TABLE 2-2

FE5840Q 100 pt with $Al_2O_3$/CuO fillers with amino-PDMS release fluid

| Sample ID | C-2 | E-6 |
|---|---|---|
| Formulation | 120/10 untreated | 120/10 with 1% sec-NCR |
| Jam rates: | | |
| 340° F. | 0 | 0 |
| 365° F. | 0.0060 | 0 |
| 395° F. | 0.2000 | 0.0029 |
| Dry release | 105 | 178 |
| Heating roller contamination | 6208 | 856 |

Sec-NCR-N-phenylaminopropyltrimethoxysilane

The results show that the rollers of the invention experienced better dry release and less heating roller contamination than the comparative example—rollers with an elastomer surface without a coupling agent.

The invention has been described in detail with particular reference to certain preferred embodiments thereof, but it will be understood that variations and modifications can be effected within the spirit and scope of the invention.

What is claimed is:

1. A fuser member comprising a support and coated thereon a fluoroelastomer layer comprising a metal oxide filler and a silane coupling agent.

2. The fuser member of claim 1 wherein the fluoroelastomer comprises:

$$----(CH_2CF_2)_x;$$

$$----(CF_2CF_2)_y;$$

and $$—(CF_2\overset{\overset{CF_3}{|}}{C}F)_z;$$

where x is from 30 to 90 mole percent, y is from 10 to 70 mole percent, and z is from 0 to 30 mole percent.

3. The fuser member of claim 2, wherein x is 52 mole percent, y is 34 mole percent, and z is 14 mole percent.

4. The fuser member of claim 2, wherein x is 53 mole percent, y is 26 mole percent, and z is 21 mole percent.

5. The fuser member of claim 1 wherein said metal oxide filler is selected from a group consisting of aluminum oxide and cupric oxide.

6. The fuser member of claim 5 wherein the aluminum oxide is 30 to 170 parts by weight per 100 parts by weight of the fluoroelastomer.

7. The fuser member of claim 5 wherein the cupric oxide is 10 to 50 parts by weight per 100 parts by weight of the fluoroelastomer.

8. The fuser member of claim 1 wherein the silane coupling agent has the structure:

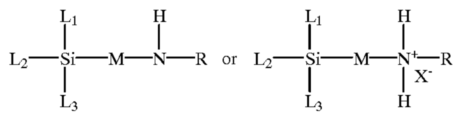

wherein

M represents aliphatic or aromatic chain with C atom numbers varying from 0–20;

R represents proton, phenyl or alkyl;

L1, L2, L3 represents alkoxy, alkyl, halide, with C atom numbers varying from 0–10 and at least one of the L should be alkoxy or halide; and X represents negative counter ion.

9. The fuser member of claim 8 wherein the silane coupling agent comprises a functional group selected from alkoxy and halide.

10. The fuser member of claim 8 wherein the silane coupling agent is selected from the group consisting of aminopropyl triethoxysilane, aminopropyl dimethoxyethoxysilane, and N-(2-Aminoethyl-3-aminopropyl trimethoxysilane.

11. A fuser member comprising:

a support;

a base cushion layer; and a fluoroelastomer layer comprising a metal oxide filler and a silane coupling agent having a reactive functional group.

12. The fuser member of claim 11 wherein the base cushion layer comprises silicone rubber.

13. The fuser member of claim 11 wherein the base cushion layer contains a thermally conductive filler.

14. The fuser member of claim 11 further comprising an adhesion layer between the base cushion layer and the fluoroelastomer layer.

15. The fuser member of claim 1 or 2, further having a polydimethylsiloxane release agent applied to the fluoroelastomer layer in an amount sufficient to produce, upon incubation at elevated temperature, a surface having desirable toner release properties on said outermost layer.

16. The fuser member of claim 15 wherein the polydimethylsiloxane release agent comprises an aminoalkyl functional group reactive with the fluoroelastomer.

17. The fuser member of claim 15 wherein the polydimethylsiloxane release agent comprises a functional group interactive with the silane coupling agent.

18. The toner fuser member of claim 15 wherein the polydimethylsiloxane release agent has the formula

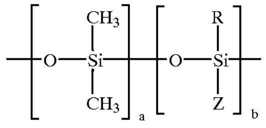

where R is alkyl or aryl, Z is selected from the group consisting of hydrogen, aminoalkyl containing up to about 8 carbon atoms, and mercaptoalkyl containing up to about 8 carbon atoms, and the ratio of a:b is about 1:1 to 3000:1.

19. The toner fuser member of claim 18 wherein Z is hydrogen, aminopropyl, or mercaptopropyl.

20. The toner fuser member of claim 18 wherein Z is hydrogen and the a:b ratio is about 10:1 to 200:1.

21. The toner fuser member of claim 18 wherein Z is aminopropyl and the a:b ratio is about 200:1 to 2,000:1.

22. The toner fuser member of claim 18 wherein Z is aminopropyl or hydrogen.

23. A method of making a fuser member comprising the steps of a) providing a cylindrical core;

b) compounding a fluoroelastomer with a metal oxide filler and a silane coupling agent;

c) coating the fluoroelastomer on the cylindrical core; and d) curing the fuser member.

24. The method of claim 23 wherein a base cushion layer is deposited on the core prior to step c).

25. The method of claim 24, further comprising the step of coating an adhesion layer on the base cushion layer prior to step c).

* * * * *